(12) United States Patent
Guan

(10) Patent No.: US 9,092,877 B2
(45) Date of Patent: Jul. 28, 2015

(54) IMAGING DEVICE INCLUDING TARGET TRACKING FUNCTION

(75) Inventor: Haike Guan, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 421 days.

(21) Appl. No.: 13/519,610

(22) PCT Filed: Feb. 14, 2011

(86) PCT No.: PCT/JP2011/053582
§ 371 (c)(1),
(2), (4) Date: Jun. 28, 2012

(87) PCT Pub. No.: WO2011/102495
PCT Pub. Date: Aug. 25, 2011

(65) Prior Publication Data
US 2012/0293665 A1  Nov. 22, 2012

(30) Foreign Application Priority Data

Feb. 16, 2010 (JP) .................................. 2010-031292

(51) Int. Cl.
*H04N 5/225* (2006.01)
*G06T 7/20* (2006.01)

(52) U.S. Cl.
CPC ....... *G06T 7/204* (2013.01); *G06T 2207/10016* (2013.01)

(58) Field of Classification Search
CPC ...................... G06T 2207/10016; G06T 7/204
USPC ........................................................ 348/169
See application file for complete search history.

(56) References Cited

U.S. PATENT DOCUMENTS 8,295,606 B2 * 10/2012 Li et al. .......................... 382/195
2003/0103648 A1 * 6/2003 Ito et al. ......................... 382/103
(Continued)

FOREIGN PATENT DOCUMENTS

| EP | 2 107 500 A2 | 10/2009 |
| JP | 7-30801 A | 1/1995 |

(Continued)

OTHER PUBLICATIONS dictionary.com definition of f-value and f-number, accessed Sep. 9, 2014.*

(Continued)

*Primary Examiner* — Andy Rao
*Assistant Examiner* — Daniel Reynolds
(74) *Attorney, Agent, or Firm* — Oblon, McClelland, Maier & Neustadt, L.L.P.

(57) ABSTRACT

An imaging device includes an imaging unit capturing an image of a subject, and tracks, through images captured in time series, an area in which a specific target appears. The device includes a parameter acquiring unit acquiring a photographic parameter from the imaging unit, a target area determining unit determining an area of a captured image including the specific target as a target area, a track area adjusting unit setting a track frame for a track area to track the target area including the specific target and adjusting a size of the track frame based on the photographic parameter, and a track area searching unit searching the captured image for the track area, while moving the size-adjusted track frame, based on a similarity between a characteristic amount of the track area of a current captured image and that of the target area of a previous captured image.

8 Claims, 7 Drawing Sheets

(56) References Cited

U.S. PATENT DOCUMENTS

| | | |
|---|---|---|
| 2008/0218635 A1 | 9/2008 | Tsuruoka |
| 2009/0231458 A1 | 9/2009 | Moriyama |
| 2009/0244315 A1* | 10/2009 | Miura et al. ............... 348/222.1 |

FOREIGN PATENT DOCUMENTS

| | | | |
|---|---|---|---|
| JP | 07030801 A | * | 1/1995 |
| JP | 8-249450 A | | 9/1996 |
| JP | 2000-101902 A | | 4/2000 |
| JP | 2000101902 A | * | 4/2000 |
| JP | 2003 235035 | | 8/2003 |
| JP | 2003-274271 A | | 9/2003 |
| JP | 2006-276948 A | | 10/2006 |
| JP | 2006276948 A | * | 10/2006 |
| JP | 2007-17401 A | | 1/2007 |
| JP | 2007-94536 A | | 4/2007 |
| JP | 2007-129480 A | | 5/2007 |
| JP | 2007 142670 | | 6/2007 |
| JP | 2008 153879 | | 7/2008 |
| JP | 2009 10453 | | 1/2009 |
| JP | 2009 246700 | | 10/2009 |
| KR | 2003-0046323 A | | 6/2003 |

OTHER PUBLICATIONS

International Search Report Issued May 24, 2011 in PCT/JP11/53582 Filed Feb. 14, 2011.

Extended European Search Report issued Jul. 15, 2013 in Patent Application No. 11744781.3.

Office Action issued Oct. 14, 2013, in Korean Patent Application No. 10-2012-7023676.

Office Action issued Jul. 29, 2014, in Japanese Patent Application No. 2011-018411.

* cited by examiner

| F-NUMBER | ISO SENSITIVITY | NOISE REMOVAL FUNCTION |
|---|---|---|
| F1 | S1 | f1 |
| F2 | S2 | f2 |
| F3 | S3 | f3 |
| ⋮ | ⋮ | ⋮ |
| Fm | Sm | fm |

IMAGE FRAME F0

IMAGE FRAME F1

IMAGING DEVICE INCLUDING TARGET TRACKING FUNCTION

CROSS REFERENCE TO RELATED APPLICATION

The present application is based on and claims priority from Japanese Patent Application No. 2010-31292, filed on Feb. 16, 2010, the disclosure of which is hereby incorporated by reference in its entirety.

TECHNICAL FIELD

The present invention relates to an imaging device which comprises a target tracking function to track, through images captured in time series, an area in which a specific target appears.

BACKGROUND ART

For tracking an area including a specific target through captured images (hereinafter, image frames) input from an imaging unit in time series, in the prior art, a target area 50 is decided from a first image frame F0 and tracked through subsequent image frames F1 to Fn as shown in FIG. 6.

FIGS. 7A to 7C show an example of results of the tracking process. From the target area 50 on the image frame F0 in FIG. 7A, a new target area 51 on the image frame F1 in FIG. 7B is acquired. Then, a new target area 52 on the image frame F2 in FIG. 7C is acquired from the target area 51. Thereafter, the same process is repeated.

There is a problem that an error in a result of tracking occurs due to a movement, deformation or change of posture of a target and is accumulated as the target area is updated. FIG. 7C shows an example of a tracking failure that the target area 52 is largely shifted from the original target area 53 of the first image frame F0. Moreover, the tracking error may cause an increase in the size of the target area, resulting in an increase in amount of calculation in the tracking process and delaying the processing speed.

Japanese Patent Application Publication No. 2008-153879 discloses an imaging device which tracks a target on an image frame of a captured image and adjusts a torque amount of an imaging unit using a motion vector as a result of the tracking, for example. However, this device still cannot eliminate a tracking error affecting a tracking result.

For another example, Japanese Patent Application Publication No. 2009-10453 discloses a technique to correct a tracking result without intermitting the tracking by allowing a user to input a desired target point on the tracking result.

However, a problem arises in this technique that since a target area is searched while expanding or shrinking the tracking result, an amount of calculation for the tracking process becomes enormous, extremely delaying the processing speed.

SUMMARY OF THE INVENTION

The present invention aims to provide an imaging device which can track, at a higher speed, a target area in which a specific target appears through images captured in time series.

According to one aspect of the present invention, an imaging device comprising an imaging unit capturing an image of a subject, and tracking, through images captured in time series, an area in which a specific target appears, comprises a parameter acquiring unit configured to acquire a photographic parameter from the imaging unit; a target area determining unit configured to determine the area of a captured image including the specific target as a target area; a track area adjusting unit configured to set a track frame for a track area to track the target area including the specific target and adjust a size of the track frame based on the photographic parameter; and a track area searching unit configured to search the captured image for the track area, while moving the size-adjusted track frame, based on a similarity between a characteristic amount of an image in the track area of the captured image in question and that of an image in the target area of a captured image immediately before the image in question in time series.

Preferably, the track area adjusting unit uses a focal length and an imaging distance of the imaging unit as the photographic parameter.

Preferably, the track area searching unit is configured to calculate the characteristic amounts of the images based on a frequency distribution in at least one of brightness and a color component.

Preferably, the imaging device further comprises a pre-processing unit configured to perform at least one of noise removal processing and brightness correction processing on at least the target area of the captured image based on the photographic parameter before the track area searching unit searches the track area.

Preferably, the pre-processing unit uses sensitivity, a focal length, and an aperture diameter of the imaging unit as the photographic parameter.

According to another aspect of the present invention, a target tracking method using an imaging device comprising an imaging unit capturing an image of a subject, for tracking, through images captured in time series, an area in which a specific target appears, comprises the steps of acquiring a photographic parameter from the imaging unit; determining the area of a captured image including the specific target as a target area; setting a track frame for a track area to track the target area including the specific target and adjust a size of the track frame based on the photographic parameter; and searching the captured image for the track area, while moving the size-adjusted track frame, based on a similarity between a characteristic amount of an image in the track area of the captured image in question and that of an image in the target area of a captured image immediately before the image in question in time series.

DESCRIPTION OF EMBODIMENTS

Hereinafter, embodiments of the present invention will be described in detail with reference to the accompanying drawings.

Figure 1:
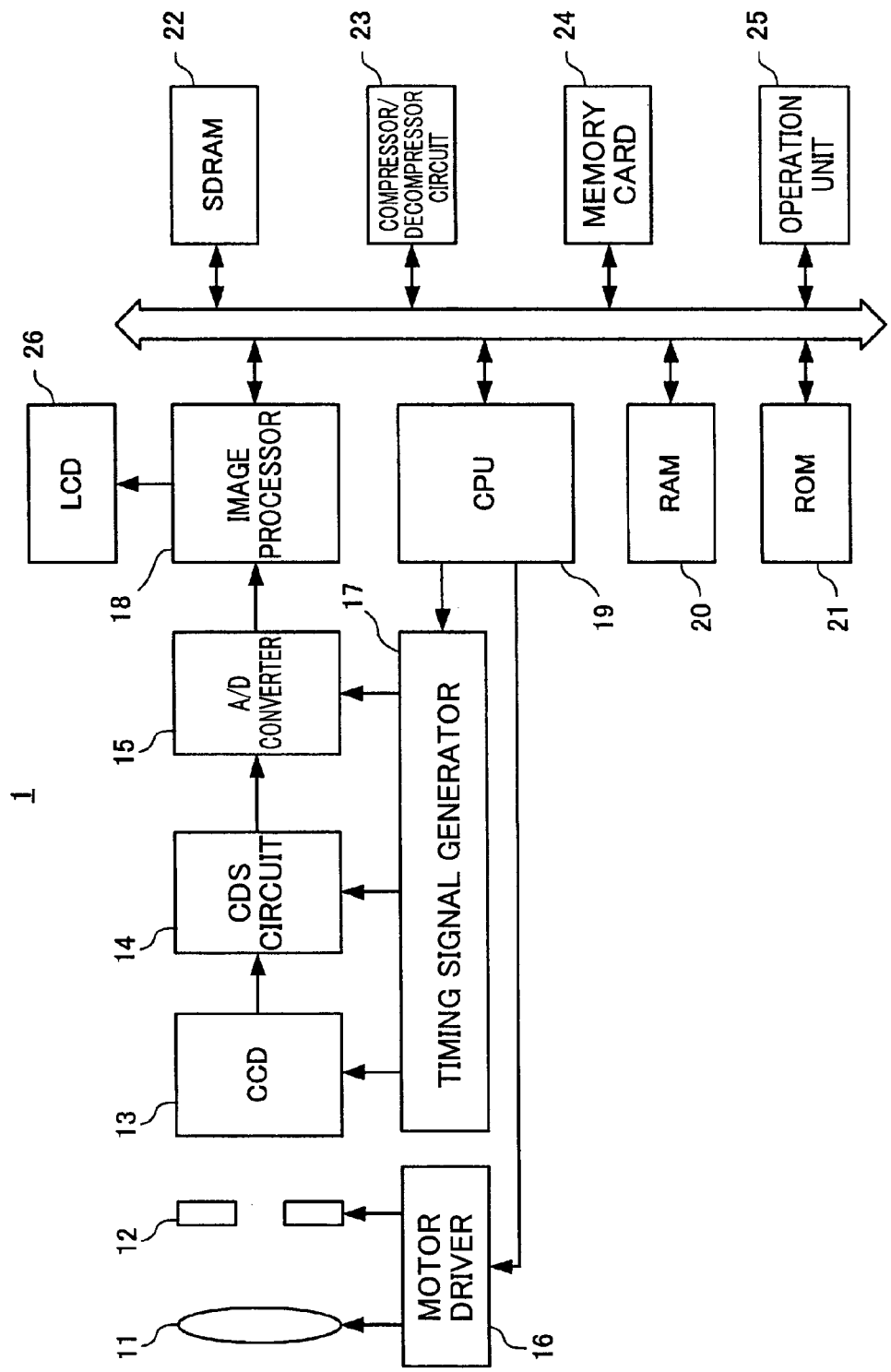
FIG. 1 is a block diagram of an imaging device according to one embodiment of the present invention.

FIG. 1 is a block diagram of an imaging device according to one embodiment of the present invention. The imaging device 1 comprises an optical system 11, a mechanical shutter 12, a charge coupled device (CCD) 13, a correlated double sampling (CDS) circuit 14, an A/D converter 15, a motor driver 16, a timing signal generator 17, an image processor 18, a central processing unit (CPU) 19, a random access memory (RAM) 20, a read only memory (ROM) 21, a synchronous dynamic random access memory (SDRAM) 22, a compressor/decompressor circuit 23, a memory card 24, an operation unit 25, and a liquid crystal display (LCD) 26.

The mechanical shutter 12 blocks light incident via the optical system 11 from entering the CCD 13. The CCD 13 includes an imaging plane on which an optical image is formed and converts the optical image into an analog image signal.

The CDS circuit 14 removes noise from the analog image signal converted by the CCD 13. The A/D converter 15 converts the analog image signal without noise into a digital image signal or image data.

The motor driver 16 drives the optical system 11 to change its position and the mechanical shutter 12 to open or close according to instructions from the CPU 19.

The timing signal generator 17 generates timing signals according to instructions from the CPU 19 to operate the CCD 13, CDS circuit 14, and A/D converter 15.

The image processor 18 allows image data to be temporarily stored in the SDRAM 22, and performs various image processing such as YCrCb conversion, white balance adjustment, contrast correction, edge enhancement, color transformation on the image data, and displays the processed image data on the LCD 26.

Here, the white balance adjustment is to adjust density of color of an image represented by image data. The contrast correction is to adjust contrast of an image represented by image data. The edge enhancement is to adjust sharpness of an image represented by image data. The color transformation is to adjust tone of an image represented by image data.

A program to operate the imaging device 1 is stored in the ROM 21. The CPU 19 allows the program in the ROM 21 to be executed for a later-described target tracking function, using the RAM 20 as a work area.

The compressor/decompressor circuit 23 compresses the image data processed by the image processor 18 according to an instruction inputted via the operation unit 25 and stores the data in the memory card 24. It also reads the image data from the memory card 24 and decompresses and outputs it to the image processor 18.

The operation unit 25 is comprised of a switch, a lever, a touch panel and else. The touch panel is provided on the LCD 26 in the present embodiment.

Figure 2:
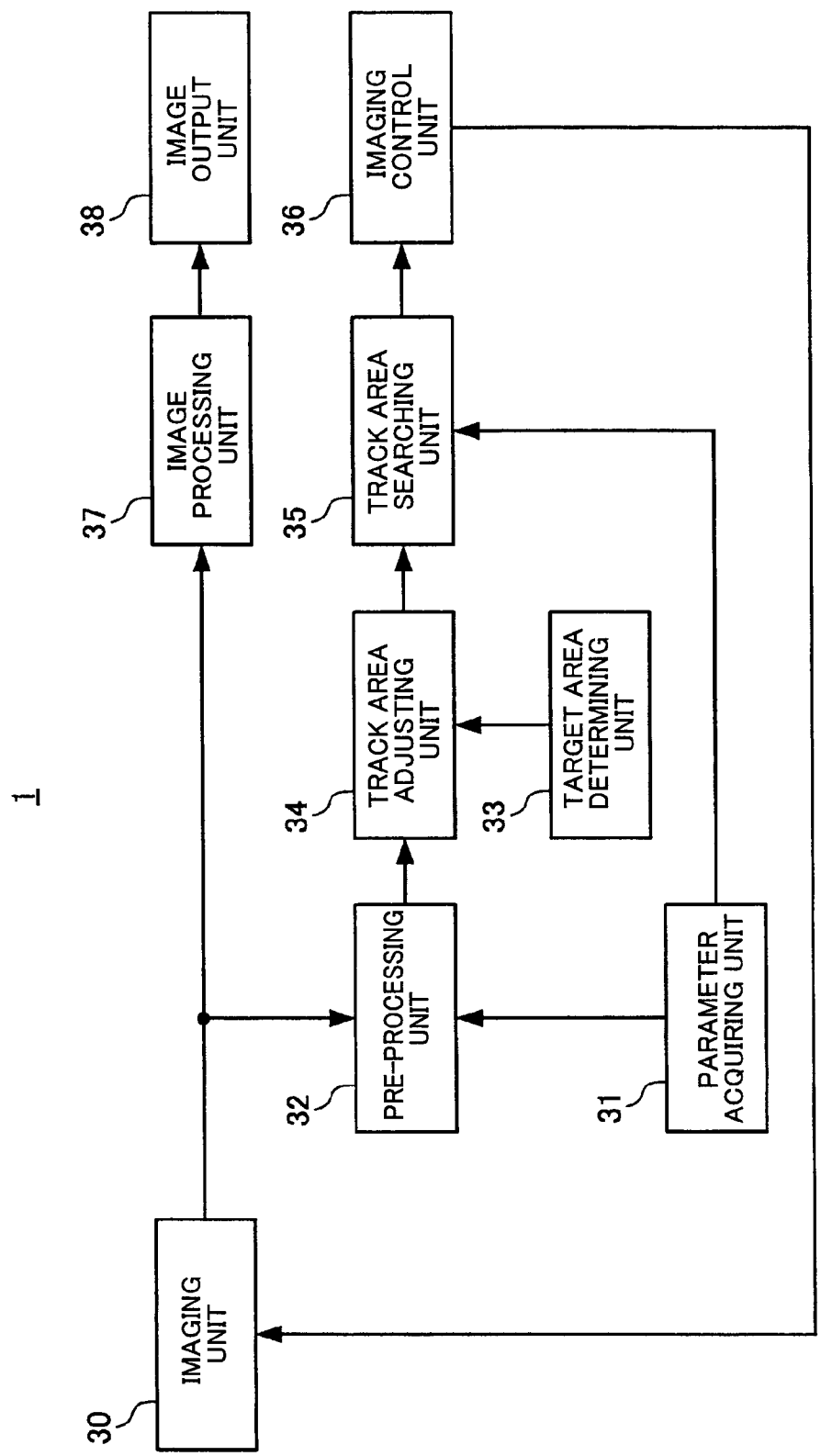
FIG. 2 is a function block diagram of the imaging device.

FIG. 2 is a function block diagram of the imaging device 1. The imaging device 1 comprises an imaging unit 30 and is configured to track an area in which a specific target appears on image frames received in time series from the imaging unit 30.

Specifically, the imaging device 1 comprises a parameter acquiring unit 31 acquiring a photographic parameter from the imaging unit 30, a pre-processing unit 32 performing pre-processing on an image frame, a target area determining unit 33 determining an area in which a specific target appears from the image frame as a target area, a track area adjusting unit 34 setting a track frame for a track area to track the specific target in the area determined by the target area determining unit 33 and adjusting the size of the track frame, a track area searching unit 35 searching the image frame for the track area including the specific target, an imaging control unit 36 controlling the imaging unit 30 based on a search result of the track area searching unit 35, an image processing unit 37 performing image processing on the image frame and an image output unit 38 outputting the processed image frame.

The imaging unit 30 comprises the optical system 11, mechanical shutter 12, CCD 13, CDS circuit 14, A/D converter 15, motor driver 16 and timing signal generator 17.

According to the present embodiment, the imaging unit 30 is configured to acquire N image frames F1 (first image frame) to FN ($N^{th}$ image frame) in time series with an interval of Δt.

The parameter acquiring unit 31 is comprised of the CPU 19 and acquires a photographic parameter from the RAM 20. Note that the photographic parameter includes a focal length, an aperture diameter, an F-number, ISO sensitivity and an imaging distance.

The pre-processing unit 32 is comprised of the CPU 19 and the image processor 18, and performs pre-processing on the image frame based on the photographic parameter acquired by the parameter acquiring unit 31. In the present embodiment it is configured to perform the noise removal processing.

Figures 3, 4:
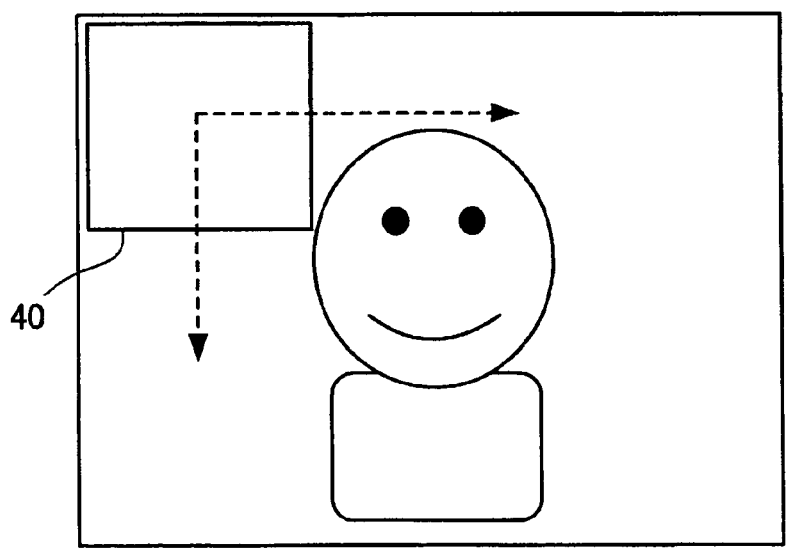
FIG. 3 shows an example of a parameter map to which a pre-processing unit of the imaging device refers.
FIG. 4 shows an example of a search operation of a track area searching unit of the imaging device.

For example, a parameter map shown in FIG. 3 is pre-stored in the ROM 21. The parameter map contains data on the F-number indicating a relation between the focal length and the aperture diameter of the imaging unit 30, ISO sensitivity, and noise removal function in association with one another.

The noise removal function is defined to make almost constant a difference in noise rate of continuous images frames when a subject is shot with different F-numbers and ISO sensitivities. That is, the noise removal function is set so that the smaller the F-number and the larger the ISO sensitivity, the higher the noise removal level.

In FIG. 2 the pre-processing unit 32 performs the noise removal processing on the image frames F0, F1 using, as the photographic parameter, noise removal functions in association with the F-numbers and ISO sensitivities obtained when the image frames F0, F1 are shot, respectively.

The pre-processing unit 32 performs the noise removal processing on image frames following the image frame F1 in the same manner. Thus, by properly removing noise in each image frame, it is made possible to prevent occurrence of an error in a tracking result and accumulation of errors due to a difference in the noise rate of continuous image frames.

Alternatively, a parameter map containing the F-number, ISO sensitivity of the imaging unit 30, and brightness correction function can be pre-stored in the ROM 21. The pre-processing unit 32 can be configured to perform brightness correction on image frames using this parameter map.

In this case, it is made possible to prevent occurrence of an error in a tracking result and accumulation of errors due to a difference in brightness of continuous image frames.

Alternatively, a parameter map containing the F-number and ISO sensitivity of the imaging unit 30, noise removal function and brightness correction function can be pre-stored in the ROM 21. The pre-processing unit 32 can be configured to perform both of the noise removal and brightness correction processings on image frames using this parameter map. Note that the noise removal function and the brightness correction function can be combined into a single function in the parameter map.

The target area determining unit 33 is comprised of the CPU 19 and the operation unit 25, and configured to identify from an image frame a certain area in which a specific target appears. The target area determining unit 33 determines the area as a target area on an image output from the image output unit 38 and surrounds the area in a rectangular frame via the operation unit 25, for example.

Alternatively, the target area determining unit 33 can be configured to allow a user to designate a single point on the image output from the image output unit 38 via the operation unit 25, and determine as a target area an area including the designated point and showing a higher contrast than other areas. In the present embodiment the image frame F0 is the one including the target area determined by the target area determining unit 33.

The track area adjusting unit 34 is comprised of the CPU 19 and configured to set a track frame for a track area to track the specific target and adjust the size of the track frame based on the focal length and the imaging distance of the imaging unit as a photographic parameter acquired by the parameter acquiring unit 31. The track area is an area to track the specific target in the target area.

Specifically, the track area adjusting unit 34 calculates a variable magnification between a previous image frame F(i−1) and a current image frame F(i) from values of the focal length and imaging distance obtained when the images frames F(i−1), F(i) are shot, and adjusts the track area in size based on calculated variable magnification.

The track area searching unit 35 is comprised of the CPU 19 and configured to track the specific target in the target area determined by the target area determining unit 33 while moving a track frame 40 size-adjusted by the track area adjusting unit 34 on the current image frame F(i) as shown in FIG. 4.

Specifically, the track area searching unit 35 searches the current image frame F(i) for an area having a highest similarity based on a characteristic amount of the target area of the previous image frame F(i−1) and that of the track area of the current image frame F(i).

In the present embodiment the track area searching unit 35 is configured to calculate the characteristic amount of an image based on a frequency distribution in brightness of the image. Specifically, it calculates the frequency distribution (q=[q1, q2, . . . qn]) in brightness of the image in the target area of the previous image frame F(i−1) and that (p=[p1, p2, . . . pn]) of brightness of the image in the track area of the current image frame F(i).

Further, the track area searching unit 35 standardizes at least one of the frequency distributions q and p based on the size of the target area of the previous image frame F(i−1) and the size of the track area of the current image frame F(i).

The track area searching unit calculates similarity Sim by the following the expression:

$$Sim = \sum_{u=1}^{n} \sqrt{p_u * q_u}$$

Then, the track area searching unit 35 determines a track area with a largest similarity Sim as a target area.

Alternatively, the track area searching unit 35 can be configured to calculate the characteristic amount based on a frequency distribution in color components (YUV or RGB) of an image instead of brightness or based on a combination of the frequency distributions in brightness and color components.

The imaging control unit 36 is comprised of the CPU 19 and configured to control the focal length of the imaging unit 30 to focus on the target area determined by the track area searching unit 35, for example. The image processing unit 37 is comprised of the image processor 18 and configured to perform various image processing on image data and output it to the image output unit 38.

The image output unit 38 is comprised of the LCD 26, compressor/decompressor circuit 23 and memory card 24. It is configured to compress the image data processed by the image processing unit 37, store it in the memory card 24 and display an image represented by the image data on the LCD 26.

Figure 5:
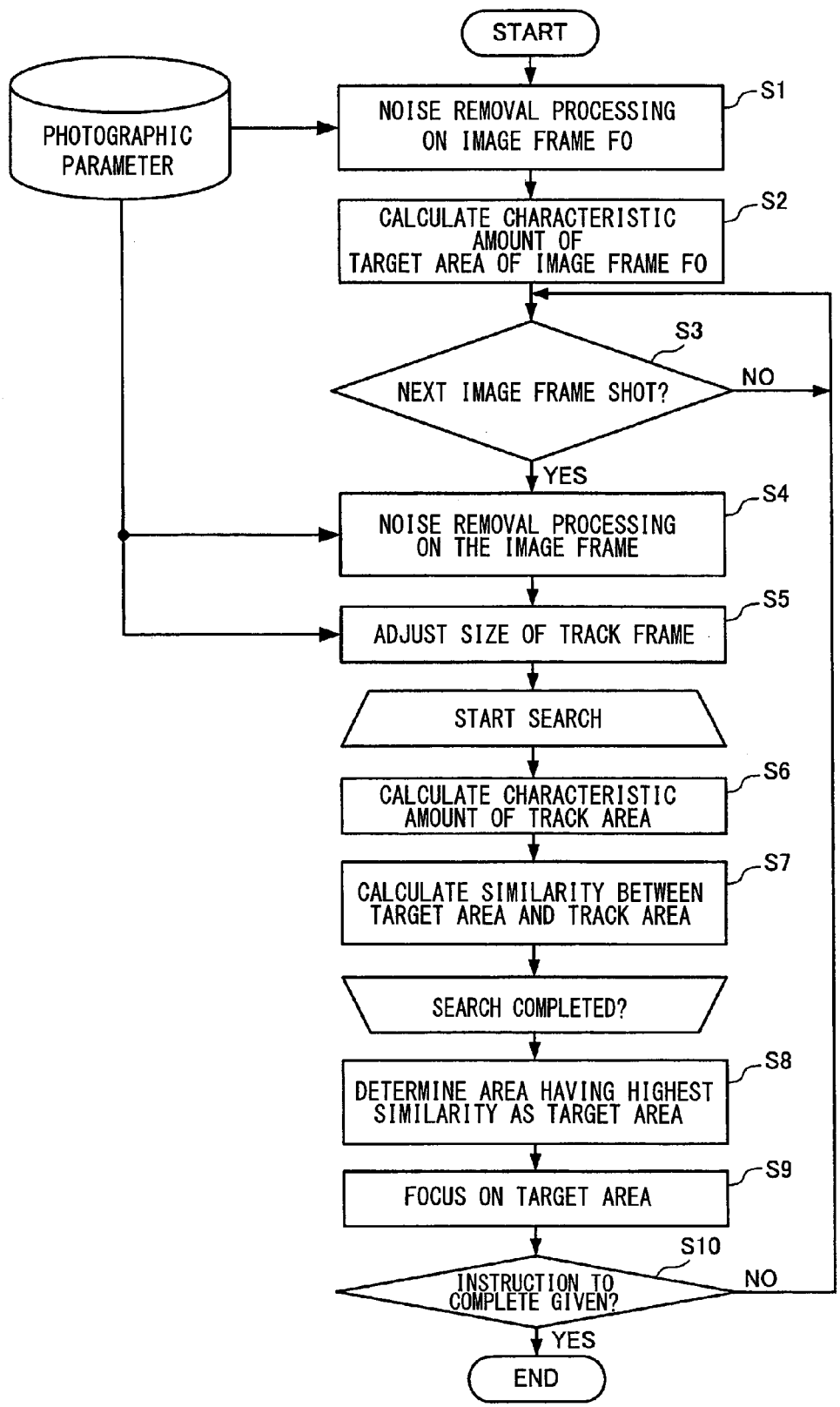
FIG. 5 is a flowchart for target tracking operation of the imaging device.
Figure 6:
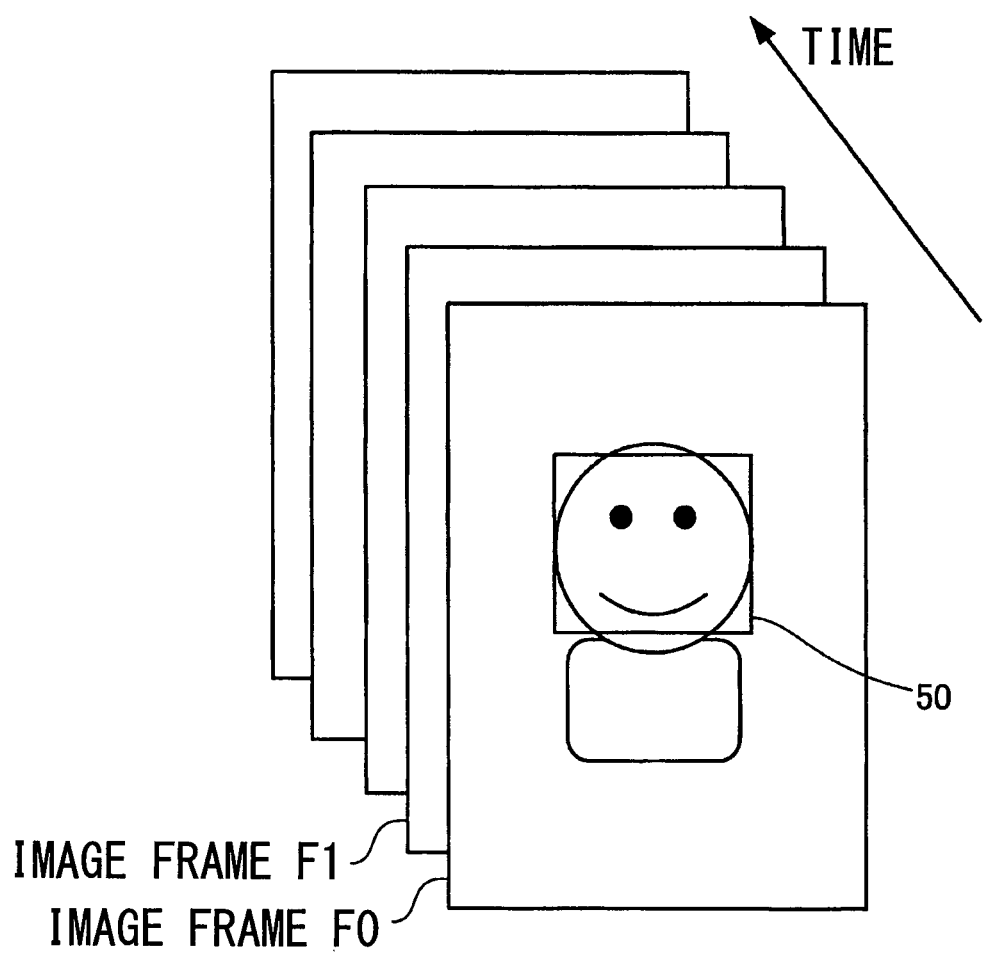
FIG. 6 shows an example of prior art image frames captured in time series.
Figure 7A:
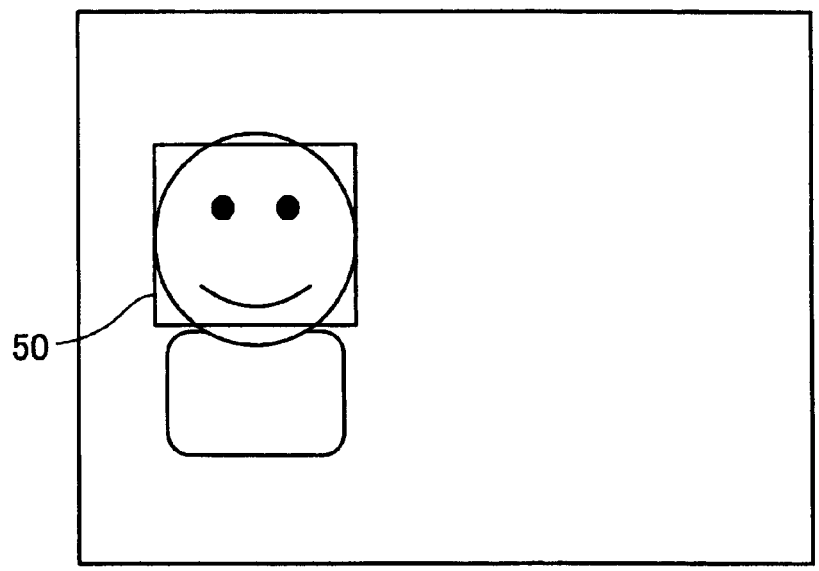
FIGS. 7A to 7C show an example of results of prior art target tracking, image frames F0, F1, FN, respectively.
Figure 7B:
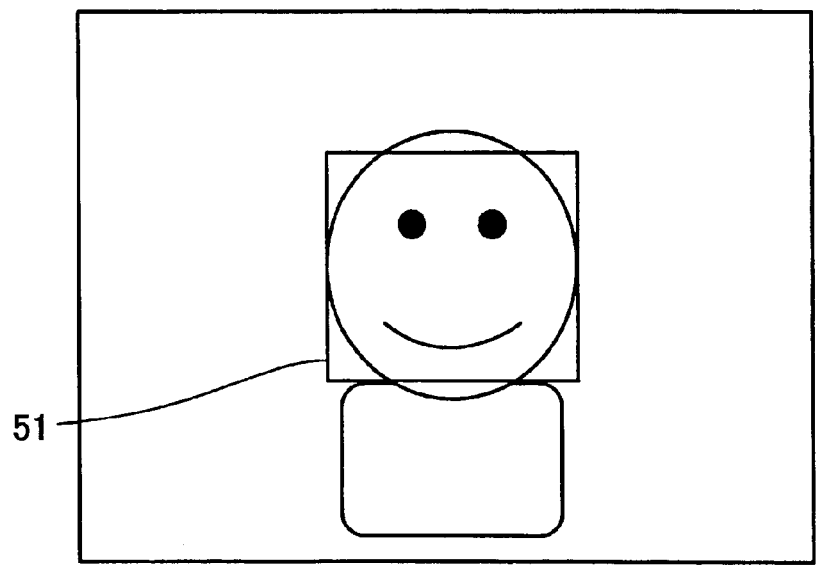
Figure 7C:
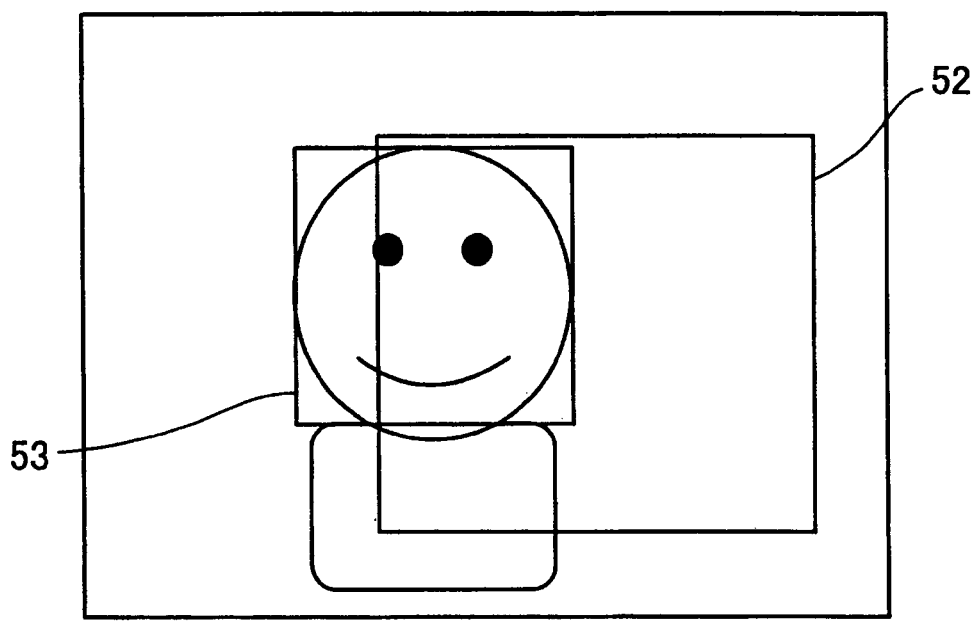

The target tracking operation of the imaging device configured above is described with reference to FIG. 5. This operation is started when an area in which a specific target appears is determined by the target area determining unit 33.

First, in step S1 the pre-processing unit 32 executes the noise removal processing on the first image frame F0 using a photographic parameter obtained when the image frame F0 is shot.

In step S2 the track area searching unit 35 calculates a characteristic amount of an image in the area of the image frame F0. When a next image frame F(i) is acquired from the imaging unit 30 in step S3, the pre-processing unit 32 executes the noise removal processing on the image frame F(i) using a photographic parameter obtained when the image frame F(i) is shot in step S4.

Next, in step S5 the track area adjusting unit 34 adjusts the size of a track area to track a target in the area of the previous image frame F(i−1), using the photographic parameters obtained when the image frames F(i), F(i−1) are shot.

In step S6 while moving the track area size-adjusted by the track area adjusting unit 34, the track area searching unit 35 calculates the characteristic amount of the track area of the image frame F(i). In step S7 the track area searching unit 35 calculates a similarity between the image in the area of the image frame F(i−1) and the image in the track area of the image frame F(i) based on the characteristic amounts of these images.

Upon completion of the search over the entire image frame F(i), the track area searching unit determines 35 a track area showing the highest similarity as a target area in step S8. In step S9 the imaging control unit 36 controls the focal length of the imaging unit 30 of to focus on the target area.

Given an instruction to complete the target track operation via the operation unit 25 in step S10, the operation ends. Without the instruction, the operation returns to step S3.

Alternatively, after step S9 of the target track operation, the track area searching unit 35 can calculate the similarity based on the characteristic amounts of an image in the target area of the current image frame and an image in the target area of the previous image frame while expanding or shrinking the target area in question, to adjust the size of the target area of the image frame F(i) based on the calculated similarity.

Further, the track area searching unit 35 can be configured to control the image processing unit 37 to have a rectangular frame indicating the target area displayed on an image on the LCD 26 after step S9.

As described above, the imaging device according to the present embodiment can adjust the size of a track area to track an area including a specific target using the photographic parameter without expanding or shrinking a result of the tracking through the entire image frame. Accordingly, compared with a prior art imaging device, it can track, with a higher speed, the area including a specific target through captured images input from the imaging unit in time series.

Further, the imaging device according to the present embodiment can calculate a variable magnification of a currently captured image relative to a previously captured image based on the focal length and imaging distance of the imaging unit and thereby adjust the size of the track area.

Further, the imaging device according to the present embodiment can calculate a similarity between a characteristic amount of an image in a track area and that of an image in a target area of a previously captured image.

Furthermore, the imaging device according to the present embodiment can pre-process image data in accordance with a noise rate or brightness.

Although the present invention has been described in terms of exemplary embodiments, it is not limited thereto. It should be appreciated that variations or modifications may be made in the embodiments described by persons skilled in the art without departing from the scope of the present invention as defined by the following claims.

The invention claimed is:

1. An imaging device comprising an imaging unit capturing an image of a subject, and tracking, through images captured in time series, an area in which a specific target appears, comprising:
   a parameter acquiring unit configured to acquire a photographic parameter from the imaging unit;
   a target area determining unit configured to determine an area of a captured image including the specific target as a target area;
   a track area adjusting unit configured to set a track frame for a track area to track the target area including the specific target and adjust a size of the track frame based on the photographic parameter; and
   a track area searching unit configured to search the captured image for the track area, while moving the size-adjusted track frame, based on a similarity between a characteristic amount of an image in the track area of the captured image in question and that of an image in the target area of a captured image immediately before the image in question in time series,
   wherein:
   the photographic parameter comprises at least two parameters which are a focal length and an imaging distance of the imaging unit, and
   the track area adjusting unit uses the focal length and the imaging distance of the imaging unit as the photographic parameter.

2. An imaging device according to claim 1, wherein the track area searching unit is configured to calculate the characteristic amounts of the images based on a frequency distribution in at least one of brightness and a color component.

3. An imaging device according to claim 1, further comprising
   a pre-processing unit configured to perform at least one of noise removal processing and brightness correction processing on at least the track area of the captured image based on the photographic parameter before the track area searching unit searches the track area.

4. An imaging device according to claim 3, wherein
   the photographic parameter used by said pre-processing unit comprises at least three parameters which are a sensitivity, a focal length and an aperture diameter of the imaging unit, and
   the pre-processing unit uses the sensitivity, the focal length, and the aperture diameter of the imaging unit as the photographic parameter.

5. A target tracking method using an imaging device comprising an imaging unit capturing an image of a subject, for tracking, through images captured in time series, an area in which a specific target appears, comprising the steps of:
   acquiring a photographic parameter from the imaging unit;
   determining an area of a captured image including the specific target as a target area;
   setting a track frame for a track area to track the target area including the specific target and adjust a size of the track frame based on the photographic parameter; and
   searching the captured image for the track area, while moving the size-adjusted track frame, based on a similarity between a characteristic amount of an image in the track area of the captured image in question and that of an image in the target area of a captured image immediately before the image in question in time series,
   wherein:
   the photographic parameter comprises at least two parameters which are a focal length and an imaging distance of the imaging unit, and
   the focal length and the imaging distance of the imaging unit are used as the photographic parameter in the track area adjusting step.

6. A target tracking method according to claim 5, further comprising the step of
   calculating the characteristic amounts of the images based on a frequency distribution in at least one of brightness and a color component in the track area searching step.

7. A target tracking method according to claim 5, further comprising the step of
   performing at least one of noise removal processing and brightness correction processing on at least the target area of the captured image based on the photographic parameter before the track area searching step.

8. A target tracking method according to claim 7, wherein
   the photographic parameter used in said performing step comprises at least three parameters which are a sensitivity, a focal length and an imaging distance of the imaging unit, and
   the sensitivity, the focal length, and a the aperture diameter of the imaging unit are used as the photographic parameter.

* * * * *